United States Patent [19]

Holy et al.

[11] Patent Number: 4,872,380
[45] Date of Patent: Oct. 10, 1989

[54] WORKPIECE POSITIONER FOR CHUCK AND CENTER MACHINING

[75] Inventors: Franz Holy, Stockerau; Walter List, Enns, both of Austria

[73] Assignee: Maschininfabrik Heid Aktiengesellschaft, Stockerau, Austria

[21] Appl. No.: 157,849

[22] Filed: Feb. 18, 1988

[30] Foreign Application Priority Data

Feb. 18, 1987 [AT] Austria ................................. 352/87

[51] Int. Cl.$^4$ ............................................ B23B 13/00
[52] U.S. Cl. ....................................... 82/124; 82/125; 294/119.1; 294/902; 414/741; 414/736; 901/37; 901/39
[58] Field of Search .................... 82/2.5, 2.7, 124, 127; 414/736, 741; 901/37, 39; 294/119.1, 902

[56] References Cited

U.S. PATENT DOCUMENTS

| | | | |
|---|---|---|---|
| 4,462,748 | 7/1984 | Inaba et al. | 82/2.7 |
| 4,482,289 | 11/1984 | Inaba et al. | 414/736 |
| 4,586,869 | 5/1986 | Nihei | 414/736 |
| 4,601,627 | 7/1986 | Oka et al. | 294/119.1 |
| 4,736,512 | 4/1988 | Gusching et al. | 82/2.7 |

FOREIGN PATENT DOCUMENTS 3420531 12/1985 Fed. Rep. of Germany .......... 82/06

Primary Examiner—Frederick R. Schmidt
Assistant Examiner—Robert Showalter
Attorney, Agent, or Firm—Herbert Dubno

[57] ABSTRACT

A workpiece positioner usable with a lathe having a headstock rotatable about a lathe axis has a base adjacent the lathe and defining an upright base axis offset from the lathe axis, a gripper support pivotal on the base about the base axis and defining a horizontal support axis, a positioner head pivotal on the support about the support axis, and a pair of grippers each including a respective pair of gripper jaws displaceable on the head transversely of the support axis. The system has a controller that normally operates hydraulically and that is connected to the base, support, head, and grippers for, during chuck machining, holding the support axis generally perpendicular to the lathe axis and pivoting the gripper about the support axis for loading a workpiece into and taking a workpiece out of the chuck, and during center machining, holding the support axis generally parallel to the lathe axis and pivoting the gripper about the support axis for loading a workpiece into and taking a workpiece out of the lathe. The pivoting through 90° about a vertical axis lets the horizontal axis such a positioner normally swings about to be set either parallel to or perpendicular to the lathe axis. One need only change the jaws when changing between chuck and center machining or when changing workpiece type.

6 Claims, 7 Drawing Sheets

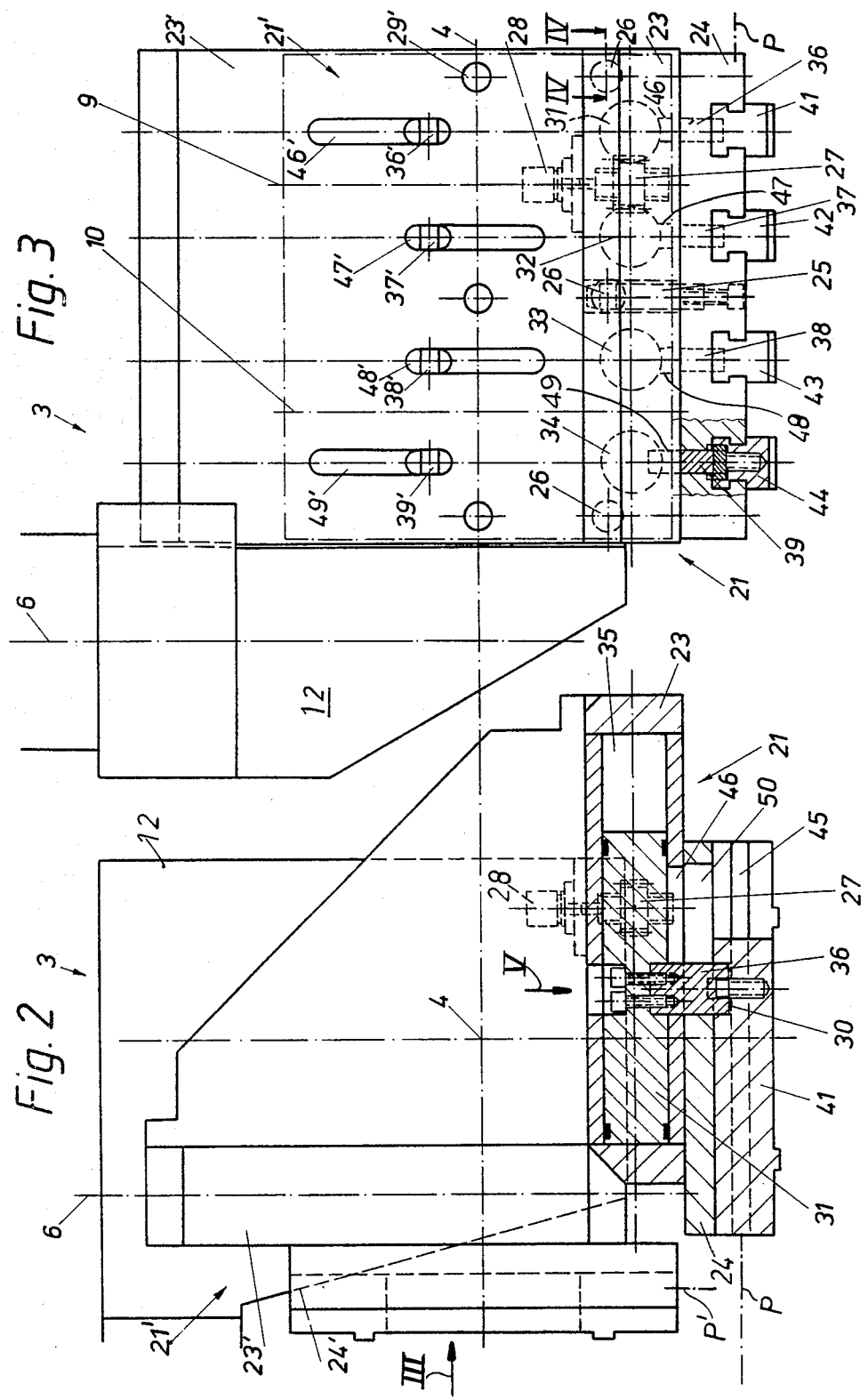

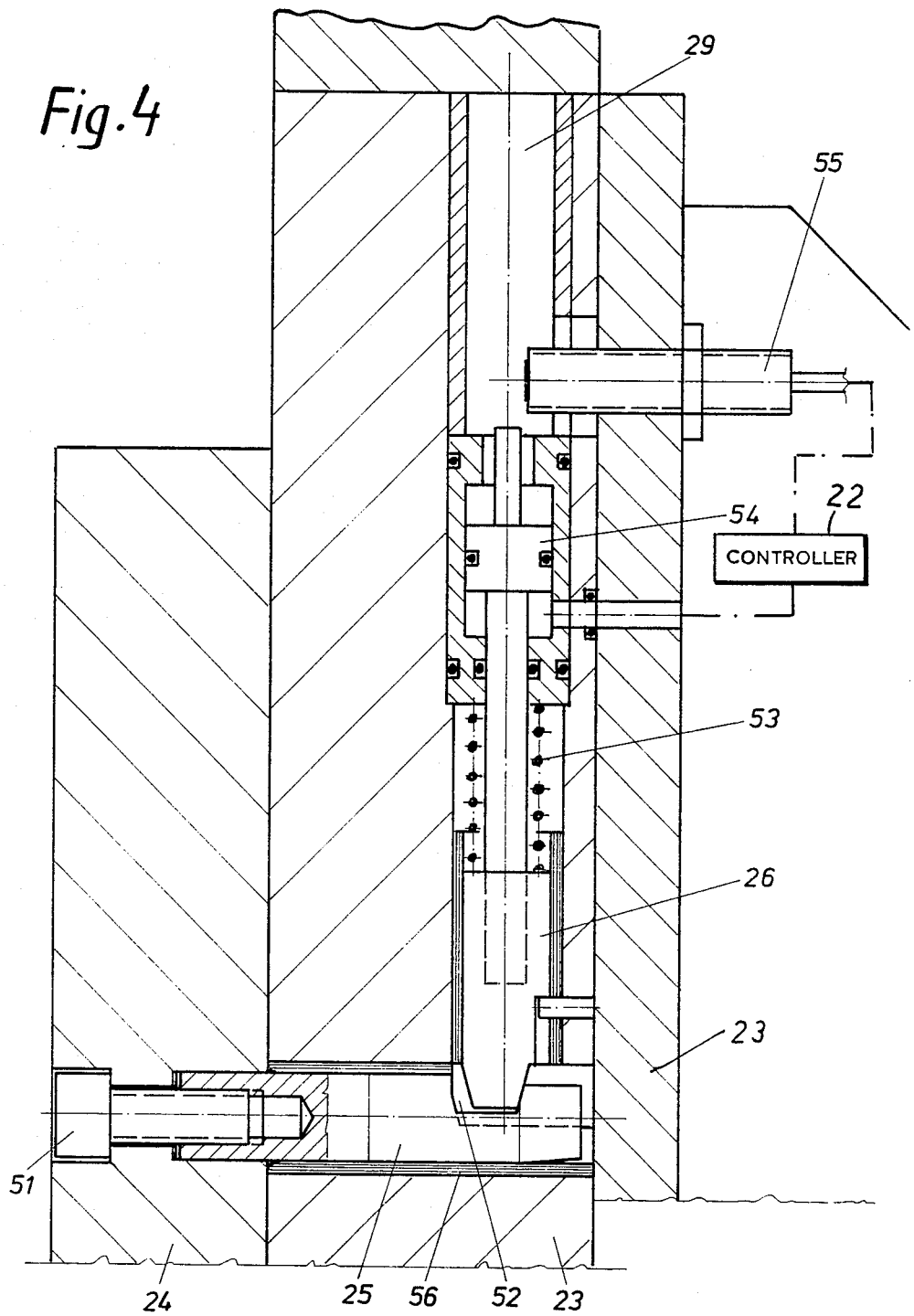

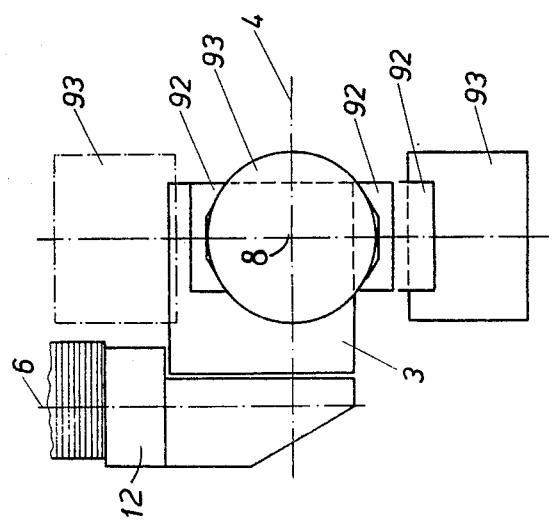
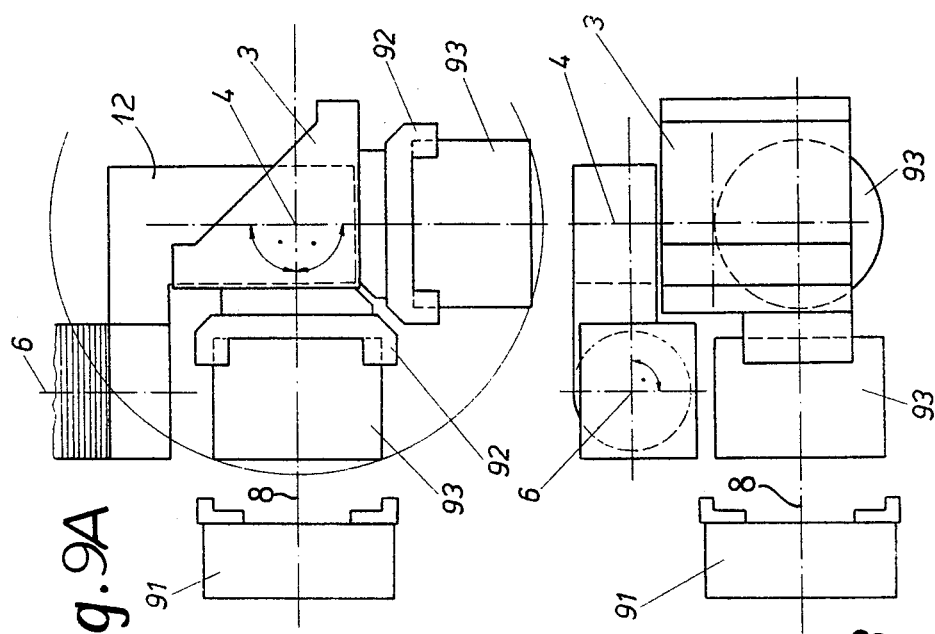
Fig. 9A
Fig. 9B
Fig. 9C

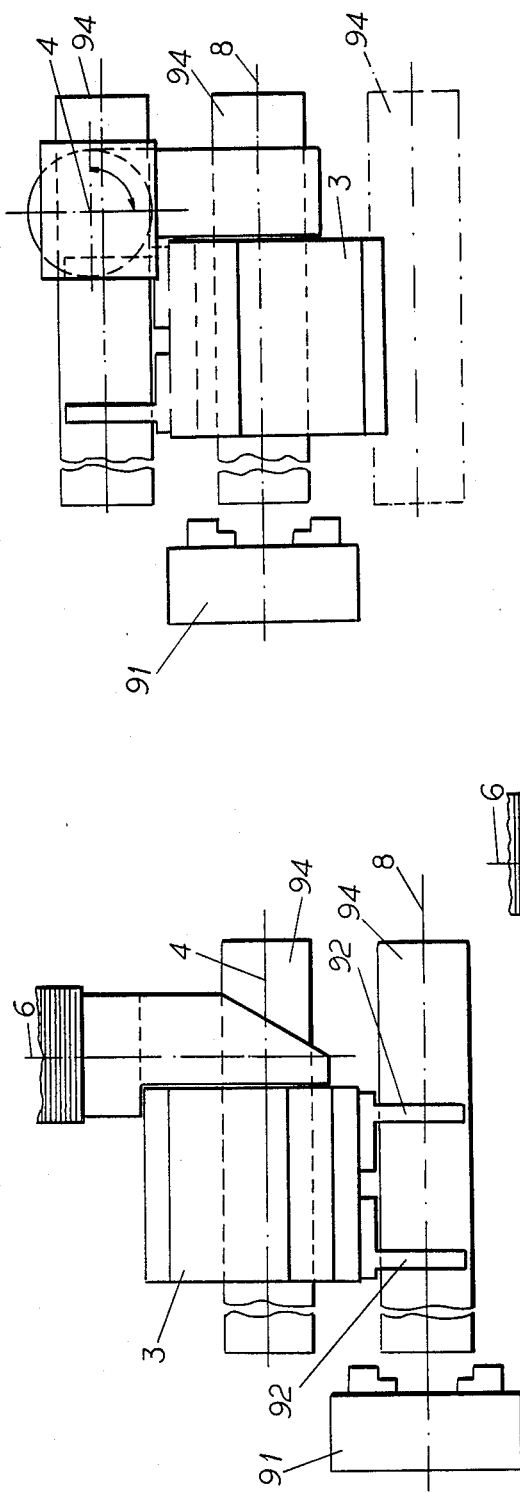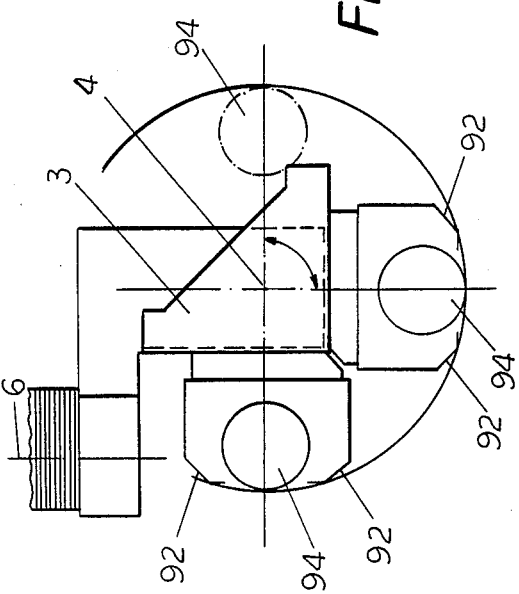

WORKPIECE POSITIONER FOR CHUCK AND CENTER MACHINING

FIELD OF THE INVENTION

The present invention relates to an apparatus for positioning a workpiece in a lathe. More particularly this invention concerns such a positioner for both chuck and center machining.

BACKGROUND OF THE INVENTION

It is standard to equip a machining lathe in an automated operation with a workpiece positioner that serves to take each machined workpiece out of the lathe when this machine is done with it and that loads a new unmachined workpiece in. As described in German patent document 3,329,619 such a positioner typically has a pair of grippers so oriented relative to a normally horizontal gripper axis that each gripper can be rotated about this axis into a position which itself is alignable by rotation of the entire gripper about another normally vertical positioner axis with the axis of the lathe.

Thus in a normal cycle one gripper of the positioner head takes an unmachined workpiece out of a magazine and, when the workpiece in the lathe is complete, the positioner head moves out and removes this finished workpiece with its other gripper which is for this purpose aligned with the lathe axis. Subsequently the positioner pivots the one gripper carrying the unmachined workpiece into the position formerly occupied by the other gripper which now holds the just-completed workpiece, and transfers this unmachined workpiece to the chuck. The positioner head then withdraws and deposits the finished workpiece in the appropriate take-off place with the other gripper and picks up another unmachined workpiece with the one gripper.

How the gripper holds the workpiece is determined by the type of lathing operation, either face or chuck machining for short workpieces and center machining for long ones. In chuck machining the workpiece is held only by the jaws of the chuck at the headstock of the lathe and its face or portions remote from the headstock are machined. In center machining the workpiece is held by the chuck at the headstock and is also supported for rotation about the lathe axis and the longitudinal workpiece axis at a center at the tailstock so that its sides between the headstock and tailstock can be machined.

For chuck machining as described in German patent document 2,444,124 the workpiece is normally held between three or four jaws that move synchronously toward and away from a center and that engage around the end of the workpiece that is remote from the chuck once the workpiece is in the chuck. Thus as the workpiece is being transferred between the positioner head and the chuck, by being gripped by the jaws of the latter and released by those of the former, the positioner jaws are spaced around and centered on the lathe axis. For center machining, however, the workpiece is gripped as described in German patent document 3,446,702 from the side midway between its ends and the gripper's jaws move in a plane including the lathe axis, normally engaging the top and bottom side of the shaft workpiece. While in face or chuck machining the workpiece can be swung about a vertical gripper axis, for center machining the gripper axis must be parallel to the lathe axis, which itself is normally horizontal, so that the workpiece does not take up too much room as it is manipulated.

Clearly the two different types of lathing operations require different types of positioners. Accordingly when a machine is switched from the one style of operation to the other it is standard to replace the positioner heads and their actuators because of the differences between the two styles of gripping and moving.

OBJECTS OF THE INVENTION

It is therefore an object of the present invention to provide an improved workpiece positioner for a lathe.

Another object is the provision of such a workpiece positioner for a lathe which overcomes the above-given disadvantages, that is which can be used both with chuck and center machining.

SUMMARY OF THE INVENTION

A workpiece positioner according to this invention usable with a lathe having a headstock rotatable about a lathe axis has a base adjacent the lathe and defining an upright base axis offset from the lathe axis, a gripper support pivotal on the base about the base axis and defining a horizontal support axis, a positioner head pivotal on the support about the support axis, and a pair of grippers each including a respective pair of gripper jaws displaceable on the head transversely of the support axis.

In addition according to this invention the system has a controller that normally operates hydraulically and that is connected to the base, support, head, and grippers for, during chuck machining, holding the gripper axis generally perpendicular to the lathe axis and pivoting the gripper about the support axis for loading a workpiece into and taking a workpiece out of the chuck, and during center machining, holding the gripper axis generally parallel to the lathe axis and pivoting the gripper about the support axis for loading a workpiece into and taking a workpiece out of the lathe.

The pivoting through 90° about a vertical axis in accordance with this invention lets the horizontal axis such a positioner normally swings about to be set either parallel to or perpendicular to the lathe axis. One need only change the jaws when changing between chuck and center machining or when changing workpiece type, it being understood that the term "workpiece" is here used in its broadest sense to cover not only the piece being machined, but also a lathe part such as a chuck, chuck jaw, or other tool or part thereof. For chuck machining normally the control means only uses one of the pairs of grippers but for center machining both are employed.

In accordance with another feature of this invention the head carries a second such pair of grippers spaced on the gripper head from the first-mentioned gripper pair and having respective gripper jaws displaceable transversely of the gripper axis but in a direction substantially perpendicular to the direction of displacement of the jaws of the first gripper pair. Each such set of gripper pairs is controlled independently of the other set. This is particularly important in center machining when the shaft workpiece or other part is of different diameters in the region to be gripped.

The grippers according to this invention each include a pair of jaws movable parallel to each other in a plane, respective double-acting cylinders adjacent the jaws, links coupling each jaw to the respective cylinder for joint movement therewith, and a synchronizing gear meshing with both cylinders for joint and opposite movement of same. The head includes a cylinder plate provided with the cylinders, a jaw plate provided with guides for the jaws, and means releasably linking the plates together. The plates are formed with registering slots at the cylinders and guides and the link means includes links projecting through the respective slots into the respective guides and there engaging the respective jaws. Furthermore the releasable link means includes pins projecting from the jaw plate into the cylinder plate and respective spring-loaded bolts movable on the cylinder plate into locking engagement with the pins. This makes it relatively easy to switch between workpieces or machining styles.

In the system of this invention the guides are each formed with a shallow indented area of limited length open toward the respective jaw and the jaw is formed with a recess of similarly limited length open away from the respective jaw. Furthermore each jaw has a key movable between a freeing position in the respective jaw recess and out of the respective plate recess and a locking position in both respective recesses and with a spring urging the respective key into the locking position. The link means is engageable with the keys when the plates are connected together to press the keys into the freeing position.

Normally according to this invention the controller is set up to identically pressurize cylinders of adjacent but different grippers. This ensures that the workpiece will be centered on the respective gripper plane and in the lathe on its axis when being transferred from or to the positioner.

It is also possible to provide the jaw plate with jaws that move mainly radially of a predetermined point and with means for converting straight-line motion of the cylinders into such radial movement of the jaws. This is particularly useful for chuck machining.

DESCRIPTION OF THE DRAWING

The above and other objects, features, and advantages will become more apparent from the following, reference being made to the accompanying drawing in which:

FIG. 2 is a larger-scale side view partly in section through the positioner head according to this invention;

FIG. 3 is an end view taken in the direction of arrow III of FIG. 2, with some parts removed for clarity of view;

FIG. 4 is a large-scale section taken along line IV—IV of FIG. 3;

FIGS. 9A, 9B, and 9C are side, top, and end views of the positioner head of this invention in use for chuck machining; and FIGS. 10A, 10B, and 10C are side, top, and end views of the positioner head in use for center machining.

SPECIFIC DESCRIPTION

Figure 1:
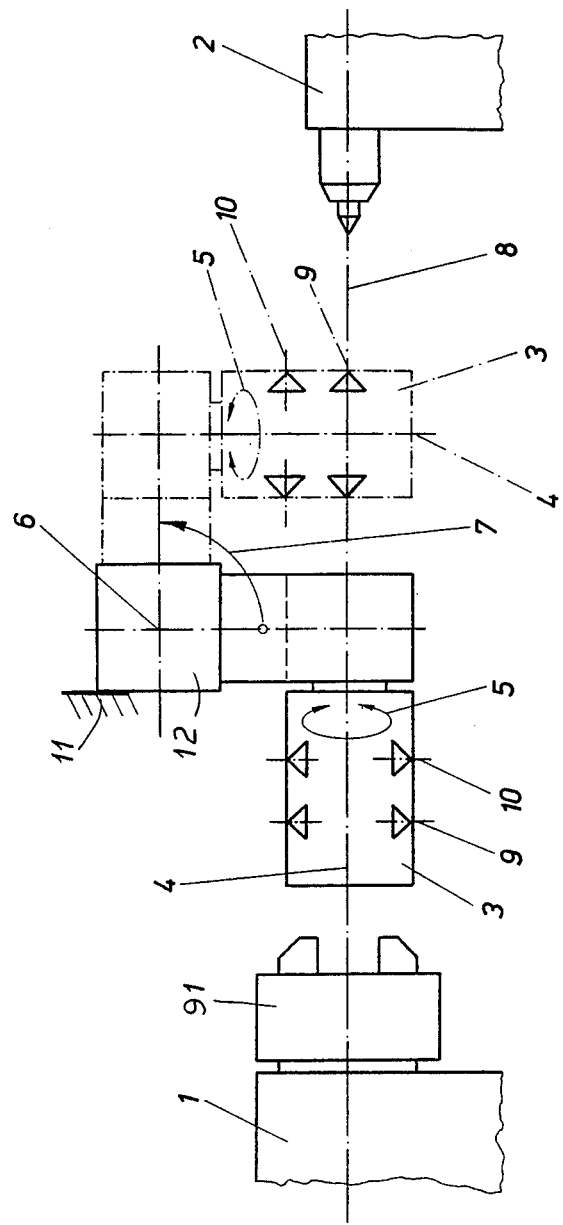
FIG. 1 is a mainly schematic and small-scale top view illustrating a lathe equipped with a positioner head constructed according to the instant invention and here shown in two alternate positions.

As seen in FIG. 1 a lathe comprises a headstock 1 and a tailstock 2 spaced apart along and centered on a horizontal lathe axis 8. The headstock 1 carries a chuck 91 that can hold a workpiece either all alone to face machine it or with the tailstock 2 to center machine it. A positioner head 3 according to this invention can pivot as shown by arrow 5 about a horizontal axis 4 on a support 12 itself displaceable on a base (shown schematically at 11 in FIG. 1) as shown by arrow 7 about a vertical axis 6 offset from the axis 4. The positioner head 3 has two sets 9 and 10 of oppositely displaceable grippers and can be moved by pivoting about the axis 6. In addition of course the entire positioner assembly formed by the head 3 with its grippers 9 and 10 and the support 12 and base 11 can be moved vertically, that is parallel to the axis 6 and horizontally both parallel and perpendicular to the axis 8. To set a workpiece in the jaws of the chuck 91 it must move somewhat parallel to the axis 8, for example.

The solid-line position of the positioner head 3 in which the axis 4 is parallel to and in fact coaxial with the lathe axis 8 is for shaft or center machining. Thus in this position a workpiece is engaged normally by both pairs of grippers 9 and 10 from the side and is normally oriented itself parallel to the axis 4. In the dot-dash-line position of FIG. 1 the positioner head 3 has its axis 4 transverse of, here perpendicularly intersecting, the axis 8 for swinging a workpiece for chuck machining. The two pairs 9 and 10 of grippers are both used for center machining, but for face or chuck machining it is often only necessary to only use the pair 9 which to this end is centered on the axis 8 in the chuck-machining position.

Actually as shown in FIGS. 2 and 3 the positioner head 3 carries two identical sets 21 and 21' each comprising two such gripper pairs 9 and 10. The sets 21 and 21' are identical and identical parts are identified with the same reference numerals, but primed for the set 21'. The sets 21 and 21' are effective in respective planes P and P' equispaced from and parallel to the axis 4 but perpendicular to each other. Thus rotation of the head 3 through 90° will bring the one set 21' into the exact position formerly occupied by the other set 21 and vice versa. As mentioned above, this construction allows the positioner in one movement to take a finished workpiece out of the lathe and replace it with an unmachined one.

The gripper set 21, which is identical to the set 21', comprises a cast-aluminum cylinder plate 23 extending parallel to the respective plane P and itself carrying a hardened-steel guide plate 24 also parallel to the plane P. The plate 24 is secured to the plate 23 via several pins 25, one of which is shown in FIG. 4. These pins 25, which extend perpendicular to the plane P, are secured in the plate 24 by bolts 51 and project into complementary holes 56 in the plate 23 where they are formed at their outer ends with seats 52 into which fit the tapered outer ends of bolts 26 slideable in the plate 23. Each bolt 26 is displaceable in a respective bore 29 parallel to the plane P and is urged into a position projecting into the respective bore 56 by a spring 53. In addition each bolt 26 carries a piston 54 whose outer face can be subjected to pressure from a controller 22 to pull it out of engagement with the respective pin 25. A position detector 55 in the plate 23 reads the position of a stem projecting from the rear end of the piston 54 to ascertain for the controller 22 if the respective bolt 26 is actually engaged in its pin 25. Simultaneous pressurization of the front faces of all the pistons 54 thereby allows a plate 24 to be lifted off the plate 23 and rapidly switched with a differently equipped such plate 24. The bolts 26 only engage the faces of the notches 52 remote from the plate 24 so that this plate 24 is held in place with no play whatsoever.

As further shown in FIGS. 2 and 3, the plate 23 is formed with four identical cylinders or bores 35 containing respective identical pistons 31, 32, 33 and 34. These pistons 31-34 are double acting and operated by the controller 22 of FIG. 4. In addition the confronting sides of the pistons 31 and 32 are formed as racks that both mesh with a common coupling pinion 27 itself connected to a position-detecting potentiometer 28 itself connected to the controller 22. Thus the one piston 31 will always move identically but oppositely to the other piston 32. The pistons 33 and 34 are similarly formed and interconnected so that the pistons 31 and 32 are the actuators for the gripper pair 9 and the pistons 33 and 34 for the pair 10. Regardless of the type of machining—chuck or center—the plate 23 and its set of actuators 31—34 are the same; only the plate 24 and its equipment is changed if necessary. Only two hydraulic connections need be made to each set 21 or 21', as the pressurization only determines position of the various pistons 31 through 34, with each piston 32 and 33 pressurized oppositely to its mate 31 and 34.

Figure 6:
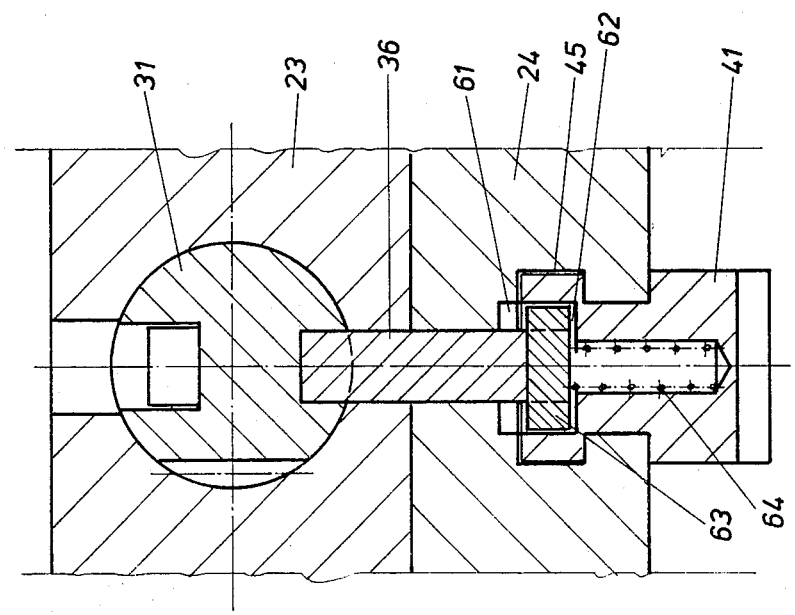
FIG. 6 is a section taken along line VI—VI of FIG. 5.
Figure 5:
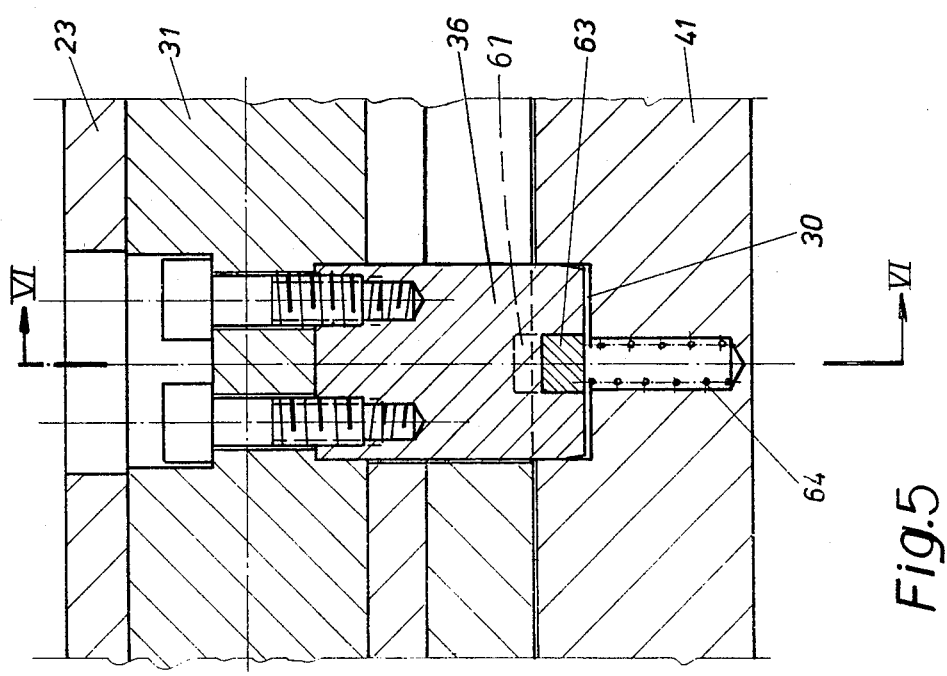
FIG. 5 is a large-scale view of the sectioned detail indicated at V in FIG. 2.

The plate 23 is formed under each piston 31, 32, 33, and 34 with a respective elongated slot 46, 47, 48, and 49, the center two offset to the outer two since their pistons 32 and 33 move opposite the pistons 31 and 34. In addition the plate 24, which is attached removably as described above with the plate 23, is formed at each piston 31—34 with a slot 50 aligned with the identical-length slot 46, 47, 48, 49 formed in the plate 23 and opening into the respective piston bore 35. The plate 24 is further formed at each slot 50 with a T-guide slot 45 receiving a respective and complementarily formed jaw mount 41, 42, 43, 44 coupled via a respective element 36, 37, 38, 39 with the respective piston 31, 32, 33, 34. As shown in FIGS. 5 and 6 for the element 36, which is identical to the elements 37, 38, and 39, this member is bolted to the respective piston 31 and has a slightly tapered end that projects into the guide slot 45 and is formed with a central notch. The jaw holder 41 itself is formed with a rectangular recess 30 of a width somewhat greater than that of the element 36 and of a length equal to that of the element end so same can fit snugly therein. When the element 36 is thus fitted into the recess 30 it therefore effectively links the carrier 41 to the piston 31 for joint movement longitudinally of this piston 31.

In addition a small parallepipedal key 63 is held in a slightly larger but complementary recess 62 formed in the back of the jaw holder 41 at the center of the recess 30. The center of the guide 45 is similarly formed with a shallow outwardly facing seat 61 generally complementary to the key 63. A spring 64 pushes the key 63 continuously toward the plate 23. When the element 36 is engaged in the recess 30, however, it fits over the key 63 and presses it down into the base of this notch 30, thereby holding it out of contact with the plate 24. When, on the contrary, the plate 24 and its holder 41 are separated and the holder 41 is shifted to a center position with the key 63 level with the recess 61, the spring 64 pushes this key 63 into the recess 61 and relatively longitudinally locks the holder 41 in the plate 24. This prevents the plate 24 from losing its parts when separated from the plate 23. Normally the controller 22 moves the pistons 31 through 35 to central positions with the keys 63 aligned with the recesses 61 between operations so that removal of the plate 24 will automatically lock the holders 41 through 45 in place.

Figure 7:
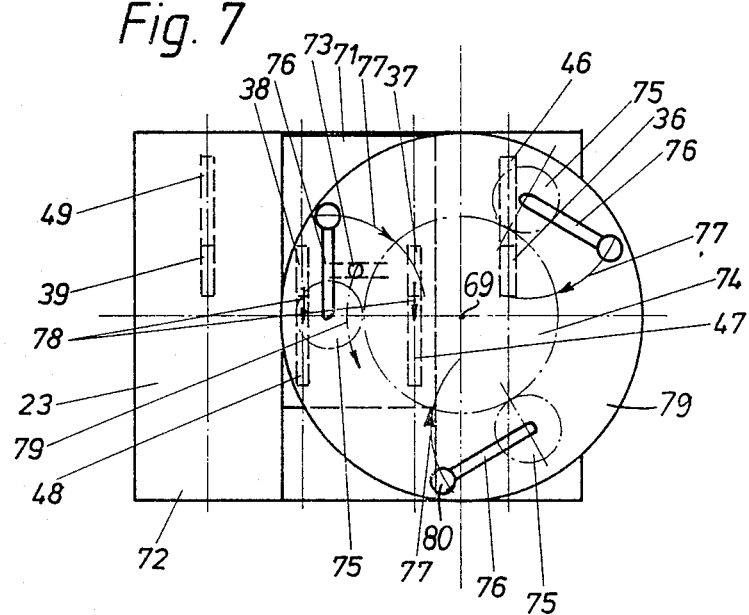
FIG. 7 is a front view of a center-machining gripper arrangement according to the invention.

FIG. 7 shows the plate 23 set up for center machining. To this end a plate 72 replaces the plate 24, although it can be held in place thereon in the same manner by the bolts 26. This plate 72 in turn carries a slide plate 71 which engages via a drive pin 73 with a circular plate 79 centered on an axis 69 and carrying three arms 75 having inner ends pivoted at locations angularly equispaced around and radially equispaced from the axis 69 and outer end carrying workpiece-engaging parts 80. A gear 75 also centered on the axis 69 meshes with gears 75 fixed on the inner ends of the arms 76. Thus when the slide plate 71 is pushed in the direction of arrows 78 by the pusher elements 37 and 38 the gears 75 are rotated to bring the parts 80 radially in toward the axis 69 to engage and center a workpiece. This type of gripper is used for chuck machining as it automatically centers a symmetrical workpiece on the axis 69, which is aligned by the controller 22 with the axis 8 as the workpiece is transferred from or to the chuck 91.

Figure 8:
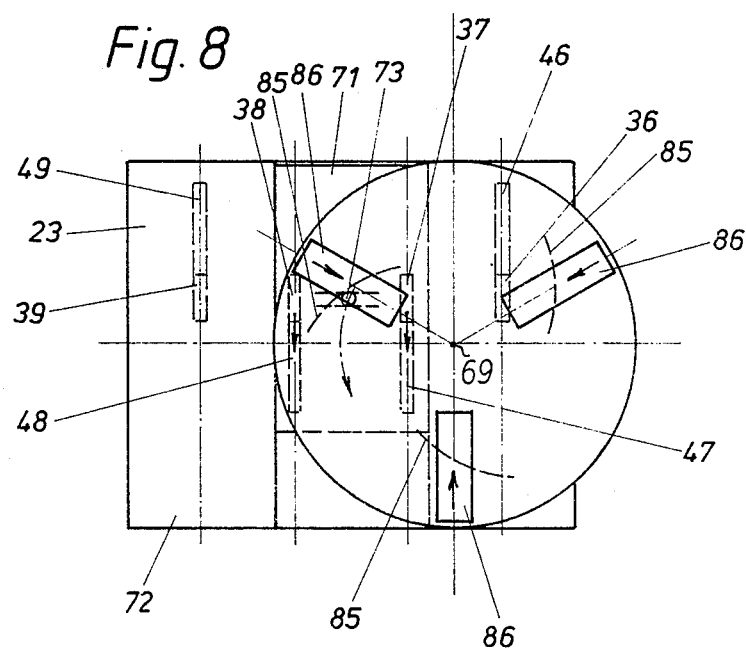
FIG. 8 is a view like FIG. 7 but of another center-type gripper arrangement.

FIG. 8 has a variation on the system of FIG. 7 where identical references are used for identical structure. Here, however, cams shown diagrammatically at 85 are rotated about the axis 69 by the slide plate 71 to move radially shiftable jaws 86 so that same move synchronously toward or away from the axis 69.

FIGS. 9A, 9B, and 9C show the system set up with its axis 4 perpendicular to the axis 8 for loading a workpiece 93 held by jaws 92 into the chuck 91. As illustrated the one jaw 92 can be mounted on the two holders 41 and 44 and the other jaw 92 on the holders 42 and 43, or the one jaw 92 can be carried on the holder 41 and the other on the holder 42. Rotation about the axis 4 is employed to bring the one workpiece 93 into the place of the other, as discussed above.

In FIGS. 10A, 10B, and 10C four jaws 92 are used, two on one side on the holders 41 and 44 and two on the other on the holders 42 and 43 to grip a workpiece 94 for center machining. Here the axis 4 is parallel to the lathe axis 8 so the shaft workpiece 94 is moved about an axis parallel to itself and to the lathe axis 8.

We claim:

1. In combination with a lathe having a headstock rotatable about a lathe axis, a workpiece positioner comprising:

a base adjacent the lathe and defining an upright base axis offset from the lathe axis;

a gripper support pivotal on the base about the base axis and defining a horizontal support axis;

a positioner head pivotal on the support about the support axis;

a pair of grippers each including a respective pair of gripper chuck jaws displaceable on the head transversely of the support axis; and control means connected to the base, support, head, and grippers for:

during chuck machining, holding the support axis generally perpendicular to the lathe axis and pivoting the gripper about the support axis for loading a workpiece into and taking a workpiece out of the chuck jaws; and during center machining, holding the support axis generally parallel to the lathe axis and pivoting the gripper about the support axis for loading a workpiece into and taking a workpiece out of the lathe, each gripper including a pair of jaws movable parallel to each other in a plane;

respective double-acting cylinders adjacent the jaws;

link means coupling each jaw to the respective cylinder for joint movement therewith; and a synchronizing gear meshing with both cylinders for joint and opposite movement of same, said head including a cylinder plate provided with the cylinders, a jaw plate provided with guides for the jaws, and means releasably linking the plates together.

2. The workpiece positioner defined in claim 1, further comprising a second such pair of grippers spaced on the gripper head from the first-mentioned gripper pair and having respective gripper chuck jaws displaceable transversely of the support axis but in a direction substantially perpendicular to the direction of displacement of the jaws of the first gripper pair.

3. The workpiece positioner defined in claim 1 wherein the plates are formed with registering slots at the cylinders and guides and the link means coupling each jaw includes links projecting through the respective slots into the respective guides and there engaging the respective jaws.

4. The workpiece positioner defined in claim 1 wherein the releasable link means includes pins projecting from the jaw plate into the cylinder plate and respective spring-loaded bolts movable on the cylinder plate into locking engagement with the pins.

5. The workpiece positioner defined in claim 1 wherein the control means includes means for identically pressurizing cylinders of adjacent but different grippers.

6. In combination with a lathe having a headstock rotatable about a lathe axis, a workpiece positioner comprising:

a base adjacent the lathe and defining an upright base axis offset from the lathe axis;

a gripper support pivotal on the base about the base axis and defining a horizontal support axis;

a positioner head pivotal on the support about the support axis;

a pair of grippers each including a respective pair of gripper chuck jaws displaceable on the head transversely of the support axis; and control means connected to the base, support, head, and grippers for:

during chuck machining, holding the support axis generally perpendicular to the lathe axis and pivoting the gripper about the support axis for loading a workpiece into and taking a workpiece out of the chuck jaws; and during center machining, holding the support axis generally parallel to the lathe axis and pivoting the gripper about the support axis for loading a workpiece into and taking a workpiece out of the lathe, each gripper including a pair of jaws movable parallel to each other in a plane;

respective double-acting cylinders adjacent the jaws;

link means coupling each jaw to the respective cylinder for joint movement therewith; and a synchronizing gear meshing with both cylinders for joint and opposite movement of same, said head including a cylinder plate provided with the cylinders and a jaw plate provided with guides for the jaws, the guides each being formed with a shallow of limited length open toward the respective jaw and the jaw being formed with a recess of similarly limited length open away from the respective jaw, the jaws each being provided with a respective key movable between a freeing position in the respective jaw recess and out of the respective plate recess and a locking position in both respective recesses, and spring means urging the respective key into the locking position, the link means being engageable with the keys when the plates are connected together to press the keys into the freeing position.

* * * * *